United States Patent [19]
Ameye et al.

[11] Patent Number: 5,558,282
[45] Date of Patent: Sep. 24, 1996

[54] CROP DISCHARGE MEANS FOR A FORAGE HARVESTER

[75] Inventors: Danny R. Ameye, Zonnebeke; Dirk J. Desnijder, Wondelgem; Adrianus Naaktgeboren, Varsenare, all of Belgium

[73] Assignee: New Holland North America, Inc., New Holland, Pa.

[21] Appl. No.: 402,258

[22] Filed: Mar. 10, 1995

[51] Int. Cl.⁶ .................................................... B02C 18/22
[52] U.S. Cl. ...................................... 241/60; 241/101.742
[58] Field of Search ................................. 241/285.2, 60, 241/222, 101.742, 101.75, 101.76, 101.762, 101.763, 101.77; 56/13.3, 13.4

[56] References Cited

U.S. PATENT DOCUMENTS

| | | | |
|---|---|---|---|
| 3,126,688 | 3/1964 | Karlsson | 56/13.3 |
| 4,220,280 | 9/1980 | Phillips et al. | |
| 4,221,508 | 9/1980 | Haines | 56/13.3 X |
| 4,324,091 | 4/1982 | Wistuba et al. | 56/13.3 X |

FOREIGN PATENT DOCUMENTS 3224269  3/1983  Germany ................................. 56/13.3

*Primary Examiner*—Mark Rosenbaum
*Attorney, Agent, or Firm*—Frank A. Seemar; Larry W. Miller

[57] ABSTRACT

A forage harvester comprises a rotatable cutterhead (36), operable to comminute crop material and to deliver the same to a blower assembly (48, 49), which propels the material upwardly into a duct (52), which in turn directs it into a collecting vehicle, which is moved aside or behind the harvester. The blower assembly (48, 49) includes a rotatable blower (49) and a housing (48), which is attached to a support frame (60), affixed to the main frame (1) by three bolts (67, 65) only. The duct (52) is mounted onto a base plate (78), which is not connected to the blower (48, 49), and can be rotated at a variable speed with respect to the main frame (1). A set of pull rods (68) and studs (70) permit easy and precise adjustment of the rotor (49) to the housing (48). This arrangement prevents the deformation of the blower housing (48), during and after its assembly to the harvester, and eliminates the need for subsequent readjustment of the blower (49) to the housing (48), in order to restore the blower efficiency.

20 Claims, 7 Drawing Sheets

CROP DISCHARGE MEANS FOR A FORAGE HARVESTER

FIELD OF THE INVENTION

The present invention relates generally to forage harvesters, which have means for the comminution of crop material and discharge means, comprising blower means and duct means, operable to propel the crop material out of the forage harvester and to direct the same into a collecting vehicle. More particularly, the invention relates to the mounting of the discharge means to the frame of the forage harvester.

BACKGROUND OF THE INVENTION

Generally, forage harvesters chop crop material, such as grass or maize, into small particles for storage and subsequent feeding to livestock. Conventional harvesters comprise a rotating cutterhead with a plurality of knives, which cooperates with a stationary shear bar to cut the crop material fed thereto into small particles and deliver it to discharge means.

The comminuted crop material is normally conveyed to the inlet of a blower housing, in which paddles of a blower rotor impart sufficient energy thereto for upward ejection through a blower outlet into a curved discharge spout, which directs the flow of crop material sidewardly or rearwardly into a collecting vehicle.

Conventionally, the blower housing is connected to the harvester frame and rotatably supports the discharge spout. Efficient operation of the blower requires minimal play between the rotor and the housing. Otherwise, a portion of the crop material will not be thrown out of the blower, but accumulate on the inside of the housing and consume a portion of the rotative energy.

In most cases however, the blower arrangement comprises a substantially rigid rotor, mounted in a rather flimsy housing, which is made out of plate material A blower of this type is shown in U.S. Pat. No. 4,220,289. The housing is subject to deformation during its assembly to the harvester frame and the subsequent mounting thereto of the discharge spout. In order to prevent interference between the rotor and its paddles on the one hand, and the housing on the other hand, a considerable nominal play has to be applied inbetween. After the assembly of the blower to the harvester frame and the mounting of the spout, the efficiency of the blower can be enhanced by a time-consuming readjustment of the rotor and the paddles.

Vibrations which are induced during harvesting operations upon the housing by the voluminous spout, and deformations caused by the weight and the rotation of said spout may also engender an interference of the housing with the rotating parts. These phenomena require an even larger nominal play between these elements and may necessitate a further readjustment of the rotor and the paddles after a short utilization of the harvester.

SUMMARY OF THE INVENTION

It therefore is an object of the present invention to enhance the efficiency of the prior art blowers by reducing the risks of deformation of the housing before and during the operation of the harvester, by facilitating the access to the rotating parts and the adjustment thereof, and hence enabling the use of smaller tolerances on the play between said housing and said rotating parts.

According to the invention, a forage harvester is provided, comprising:
a main frame;
a cutterhead assembly, comprising a cutterhead, operable to comminute crop material;
blower means, disposed to receive the comminuted crop material from said cutterhead assembly, and operable to propel said crop material to a blower outlet;
duct means, disposed in operative communication with said blower outlet for discharging the crop material from the forage harvester.

This forage harvester further is characterized in that the duct means are supported by the main frame in a manner such that a direct, physical connection between the duct means and the blower means is avoided so as to preclude a direct transmission of forces from the duct means to the blower means and to enable the removal of the blower means from the forage harvester whilst the duct means remain connected to the main frame.

Preferably, no direct binding is provided between the cutterhead assembly and the blower means also. The blower outlet may be received within a cylindrical portion of a lower duct member of the duct means, which member tiltably supports an upper duct member. Three readily accessible bolts suffice to attach the blower means to the main frame. The blower rotor is rotatably supported by a gearbox which is adjustably positioned relative to the blower housing with a set of pull rods.

In order to prevent the transfer of forces from the duct means to other components than the frame of the forage harvester, the lower duct member may be mounted to a base plate, which equally supports a hydraulic cylinder for the vertical movement of the upper duct member. The lower pivot of this cylinder is positioned in vertical alignment with the pivot between the upper and the lower duct member in order to maintain a substantially horizontal movement of the upper member during the rotation of the duct means. Proper dimensioning of a cylindric portion of the lower duct member and a good location of the upper pivot of the hydraulic cylinder permit a free rotation of the duct means over more than 90° in both directions.

The lower member may be rotated by a worm and gear assembly, in which a shear bolt can be ruptured in case an excessive external load would be experienced on the upper duct member, thus permitting the duct members to give way, whenever necessary.

Inertia forces on the harvester are also confined by gradually increasing or decreasing the rotation speed of the duct means upon a beginning, respectively a cessation of a rotation command by a handle or push button.

To the rear of the upper duct member there may be mounted a pivotable deflector, whereof the vertical movement is controlled by an electrical motor. The deflector may be pivoted at a low and at a high speed, as commanded by the same handle or push button which commands the rotation of the duct means.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

The terms "front", "rear", "forward", "rearward", "right" and "left" used throughout this specification are determined with respect to the normal direction of movement of the machine in operation and are not to be construed as limiting terms.

Figure 1:
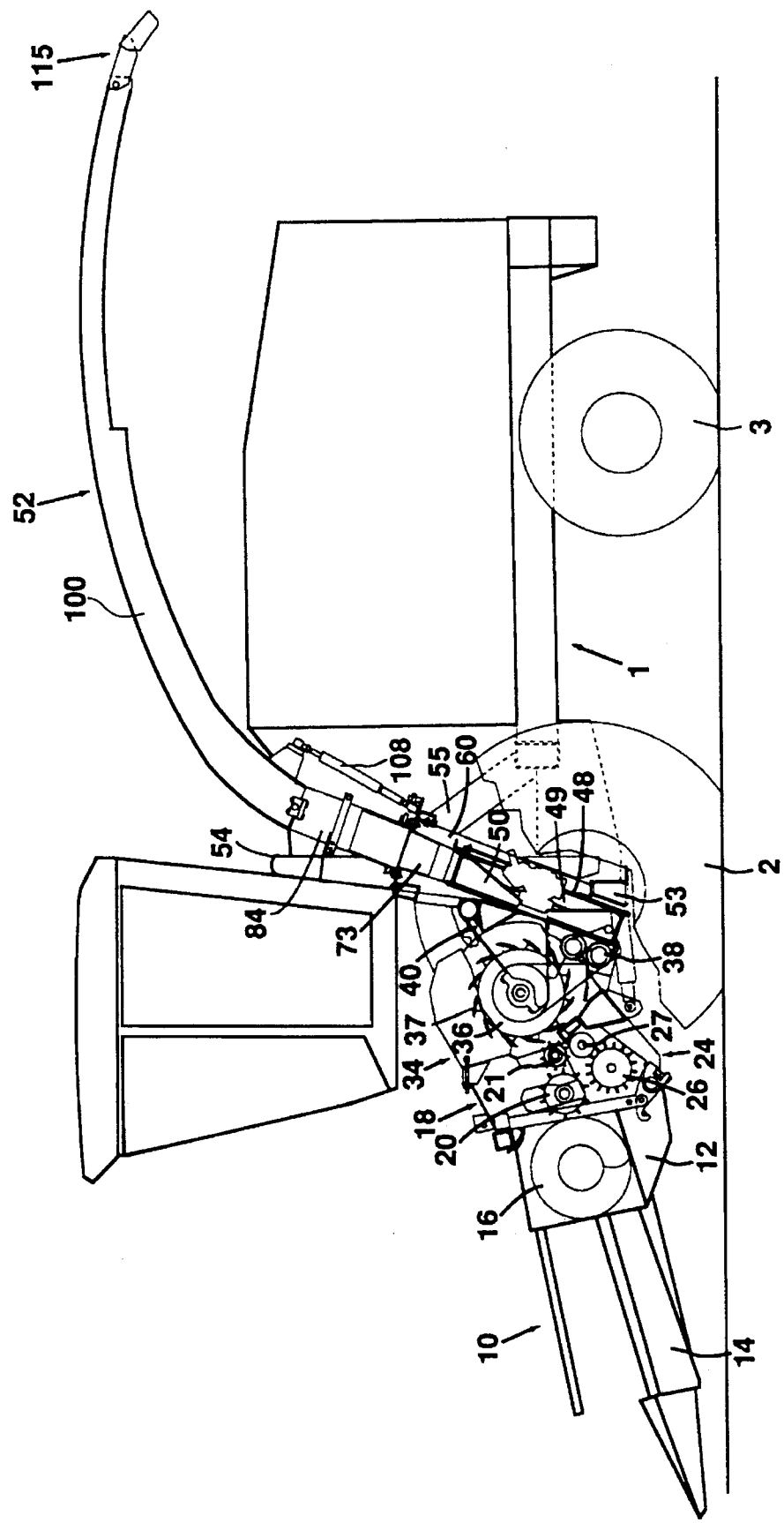
FIG. 1 is a side elevational view of a forage harvester, comprising a front unit, a blower module and duct means.

With reference to the drawings and more particularly to FIG. 1, there is shown a forage harvester having a main frame 1 on which there are mounted ground engaging traction wheels 2 and steering wheels 3. The forage harvester is shown equipped with a crop collecting apparatus, in the form of a row crop attachment 10, suitable for the harvesting of maize, but which can be replaced with a conventional windrow pick-up device or a conventional cutter bar attachment, depending on the type of crop to be harvested. Customarily, the row crop attachment 10 comprises an attachment frame 12, which supports a plurality of row crop units 14, operable to harvest maize stalks from the field and to convey the same rearwardly to an auger 16, which in turn delivers the crop material to the bite of feeder means installed in a front unit of the forage harvester.

The feeder means comprise lower feeder means, including a forward lower feedroll 26, and a smooth, rear lower feedroll 27, and upper feeder means, including an upper forward feedroll 20 and an upper rear feedroll 21. The lower feedrolls 26, 27 are rotatably mounted in a lower feeder frame 24 and the upper feedrolls 20, 21 are mounted in an upper feeder frame 18, to which the row crop attachment 10 is attached. Said upper and lower feeder means rotate to convey the crop material inbetween to a cutterhead 36, which is mounted within a cutterhead frame 34 and comprises a plurality of knives 37, generating a cylindrical peripheral shape or profile, when the cutterhead 36 is rotated.

The knives 37 cooperate with a fixed shearbar to cut the crop material to length and to project it to a pair of counter-rotating compressor rolls 38, which crack the kernels which are left in the chopped material and deliver the whole to discharge means, operable to engage the processed crop material and to direct it as required, usually into a collecting vehicle, which is moving alongside or behind the forage harvester.

The assembly of the cutterhead frame 34, the upper feeder frame 18 and the lower feeder frame 24 is attached to the main frame 1 by means of a cutterhead support 40, which is removably mounted to vertical beams 54 of the main frame 1.

The discharge means include a blower module, comprising a backward leaning blower housing 48 and a rotor 49, rotatably mounted therein and to which a plurality of paddles 50 is attached for throwing the crop material upwardly and rearwardly through the blower outlet 73. The discharge means further include duct means 52, which comprise a lower member, constituted by a straight discharge tube 84, being in alignment and in register with the blower outlet 73, and an upper member, constituted by a curved discharge spout 100, which is mounted onto said tube 84 and carries at its rear end a deflector 115.

Figure 2:
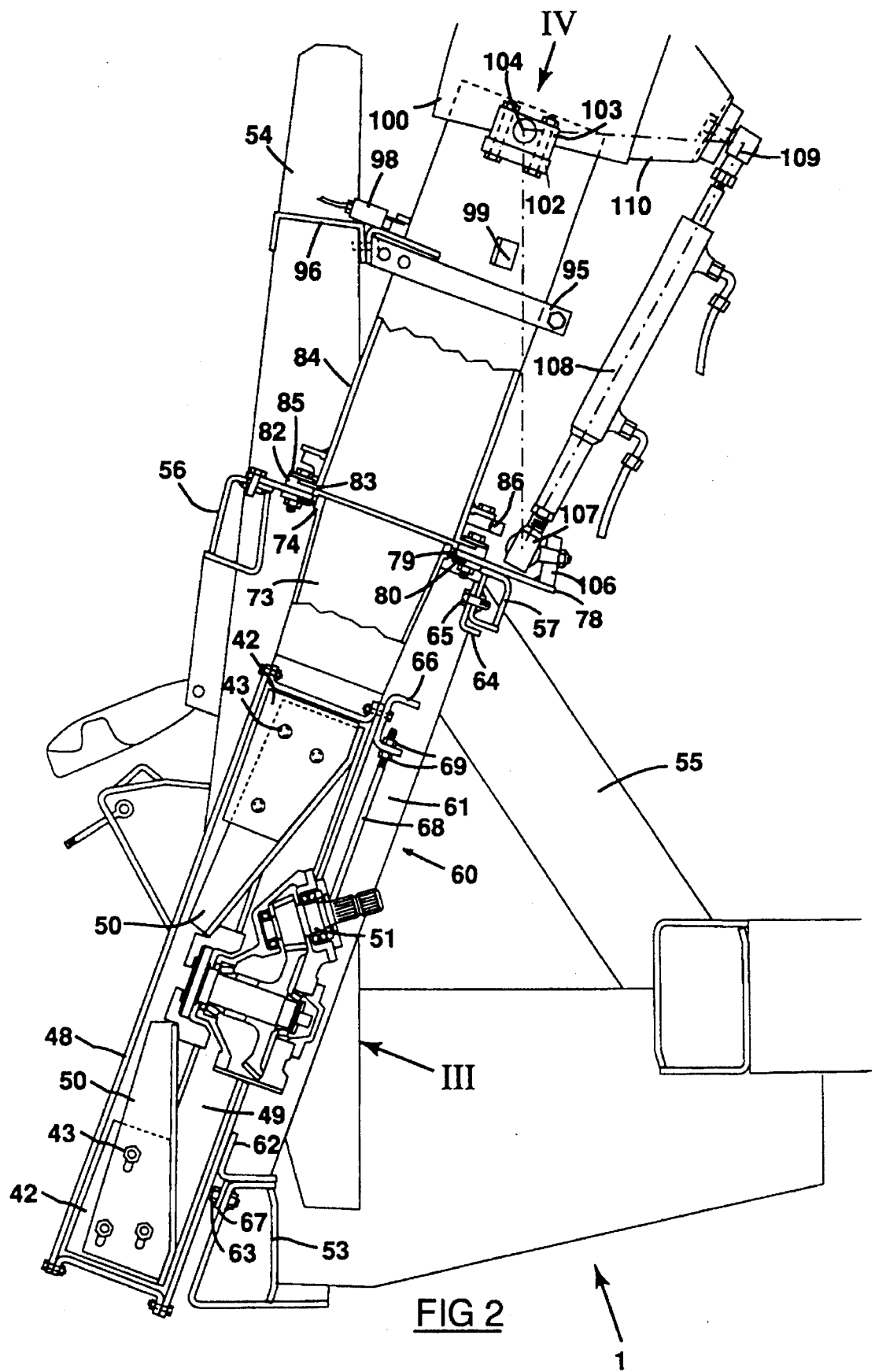
FIG. 2 is an enlarged cross sectional view of the blower means and the lower portion of the duct means of FIG. 1, after removal of the front unit.

As shown in FIG. 2, the main frame 1 comprises at its front end a cross frame member 53 and two vertical beams 54, to which a pair of struts 55 is welded. A cross frame member 56 is welded above the blower housing 48 to the beams 54. Another cross frame member 57 is welded behind the blower housing 48 to the struts 55.

Figure 3:
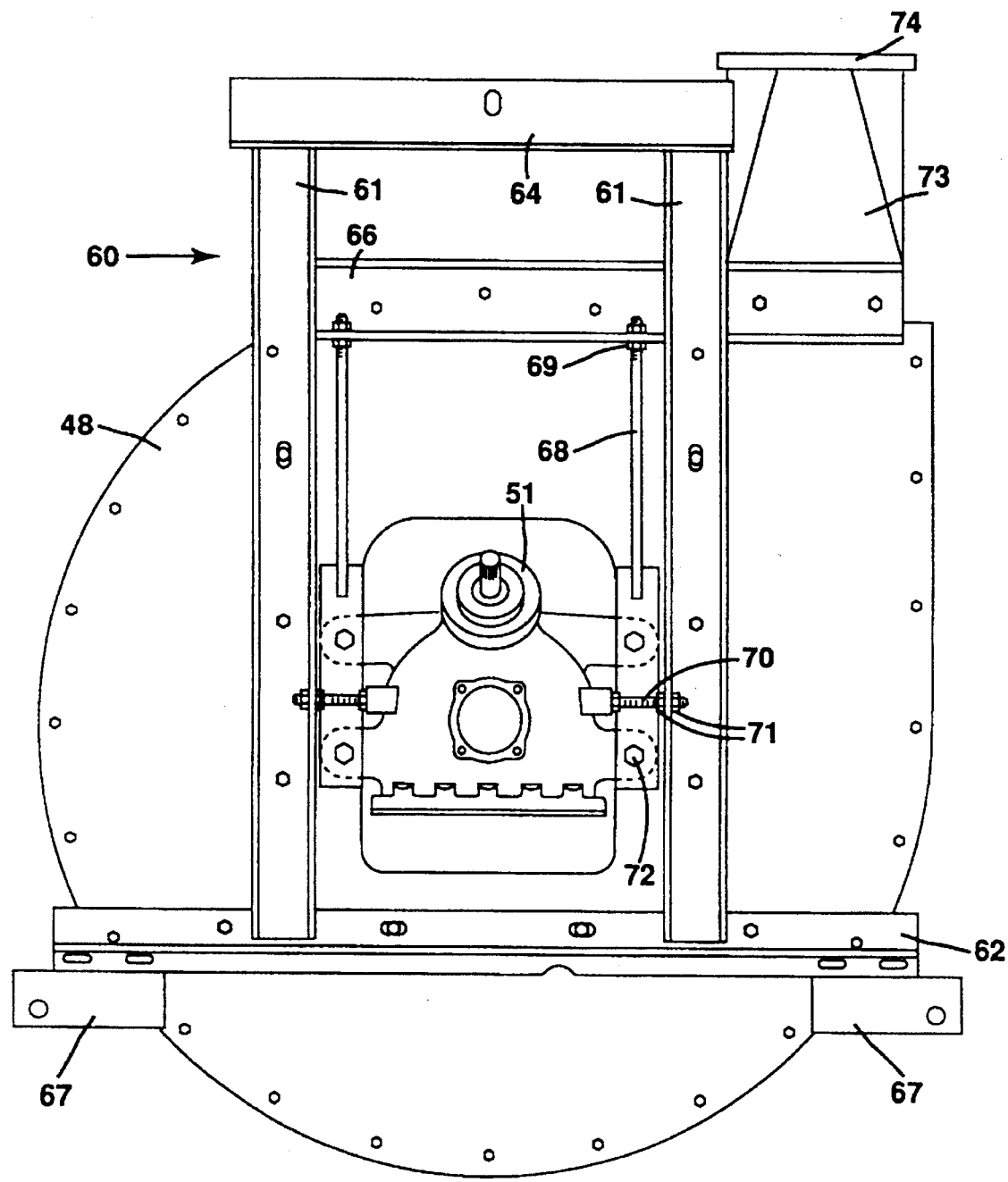
FIG. 3 shows a rear elevational view of the blower module, taken in the direction of arrow III in FIG. 2.

As can be seen in FIGS. 2 and 3, the housing 48 is mounted onto a blower support frame 60, which comprises a lower member 62 with an L-shaped section, resting on the cross frame member 53. Two vertical plates 67, welded underneath the outer ends of said lower member 62, extend transversely beyond the housing 48 and each have a hole for receiving a bolt 63 for the connection of the blower frame 60 to the cross frame member 53. The support frame 60 further comprises two inclined frame members 61, which are welded to the lower member 62 and extend above the top of the blower housing 48, and two transverse members 64, 66, whereof the upper member 64 is welded to the top of said inclined members 61 and the lower member 66 is welded inbetween the same. The upper member 64 rests against the rear cross member 57 of the main frame 1 and is attached thereto by a single central bolt 65.

The blower module is affixed to the main frame 1 by means of the three bolts 63 and 65 only and has no further connections to the other components of the harvester. When the front unit has been removed from the harvester frame, as depicted in FIG. 2, an operator, standing in the place of the front unit, has direct access to bolts 63, 65, because none of them is hidden behind the blower housing 48: the three bolts 63, 65 lie outside the projection in for-and-aft direction of housing 48.

It will be appreciated by the man skilled in the art that the blower frame 60 will not be distorted by its connection to the main frame 1: the three connection points suffice to perfectly define its position. Moreover, it has been experienced that, when four or more connection points of the blower frame 60 to the main frame 1 are used in this type of large constructions, they usually are not perfectly aligned, so that the blower frame 60 and the housing 48 are distorted during their attachment to the main frame 1, unless the alignment is improved by using close tolerances on the dimensions of the components or by applying shims to the connection points. These additional requirements are prevented by limiting the number of connection points to three.

A gearbox 51, comprising an input shaft, which is linked to an engine (not shown) of the harvester, and an output shaft, which carries the blower rotor 49, is connected with a pair of inclined pull rods 68 to the cross member 66. The vertical position of the gearbox 51 is adjusted by rotating the nuts 69, which attach the rods 68 to the cross member 66. Horizontal studs 70 extend from the sides of the gearbox 51 through the inclined frame members 61 and are attached thereto with nuts 71, which can be rotated for sideways adjustment of said gearbox 51. The blower rotor 49 is centered in the housing 48 by means of the nuts 69 and 71, whereafter the gearbox 51 is secured to the back of the housing 48 with four bolts 72.

Wear plates 42 are attached to the crop-engaging sides of the rotor paddles 50 with plow bolts 43 passing through radial slots in said paddles 50. The plates 42 thus can be radially adjusted in order to minimize the play between the outer edges of the plates 42 and the inside of the blower housing 48. Direct access to the plow bolts 43 is gained after removal of the front unit from the harvester frame 1, and as there is no direct connection between said front unit and the blower housing 48, the latter will not be distorted when the front unit is reinstalled on the harvester frame 1.

The blower outlet 73 has a rim 74, which is received in, but not connected to, a base plate 78, mounted onto the front cross member 56 and the rear cross member 57. A rubber seal 80 closes the space between the base plate 78 and the rim 74 and is held in place by a ring plate 80.

Figure 4:
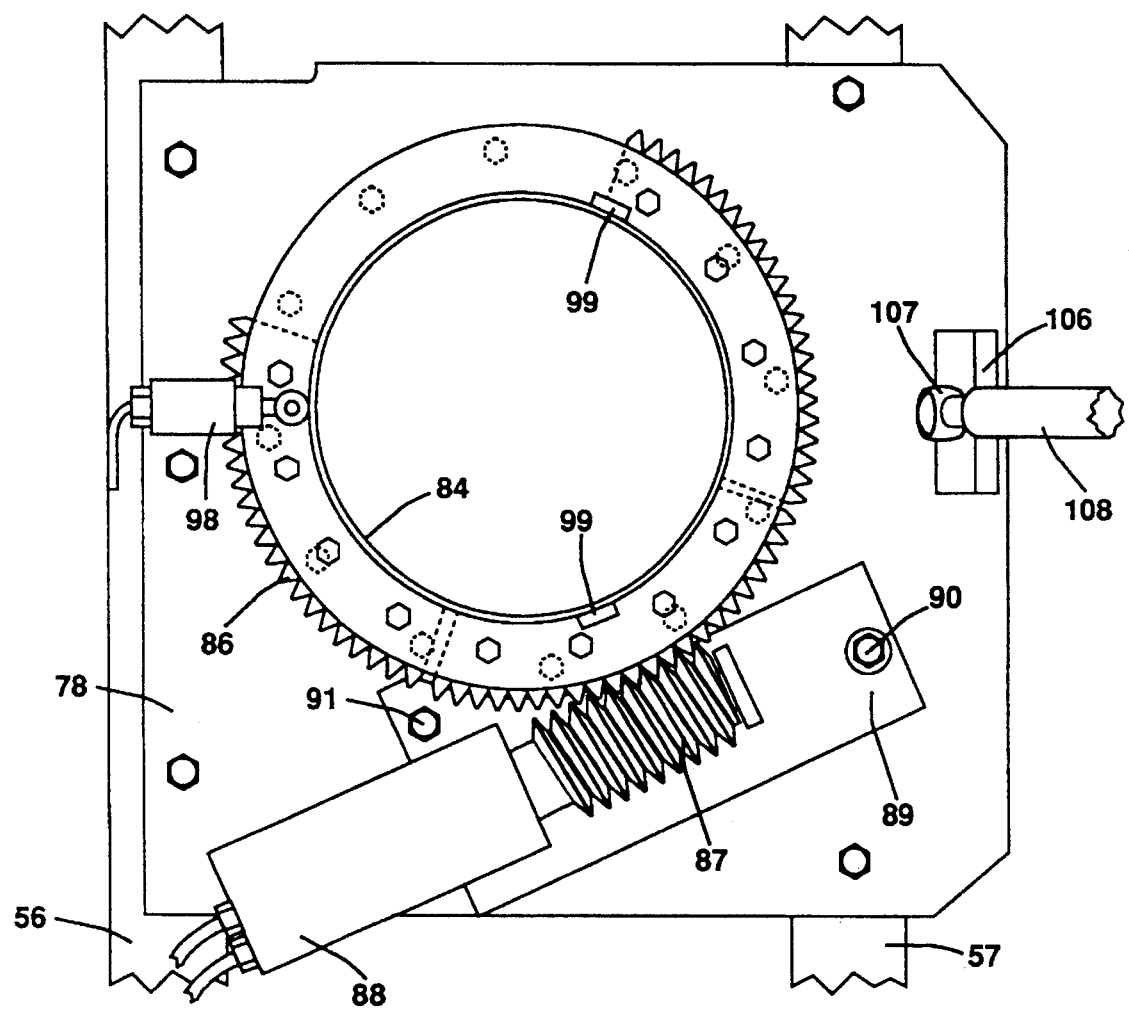
FIG. 4 is a top view of the lower portion of the duct means, taken in the direction of arrow IV in FIG. 2.

On the upper side of the base plate 78 a base ring 82 is mounted, which supports a collar 83 of the discharge tube 84. Collar 83 is rotatably secured on the base ring 82 by a clamp ring 85. As shown in FIG. 4, a segmented worm gear 86, meshing with a worm 87, is attached to the tube 84. The worm 87 is rotated by a hydraulic motor 88 in order to turn the tube 84 and hence the discharge spout 100. The assembly of the worm 87 and the motor 88 is mounted onto a worm support 89, which in turn is mounted for pivotment about a pivot 90 at the rear end of said support 89. The other end of the support 89 is affixed to the base plate 78 with a shear bolt 91, which is dimensioned to withstand the forces occurring during normal operation of the motor 88, but which will shear off under extraordinary rotational loads on the spout 100. Such loads may occur when, during travel, the spout 100 hits obstacles, such as trees, posts or buildings; the consequent load on the teeth of the gear 86 forces the worm 87 outwardly and breaks the shear bolt 91, enabling the pivotment of the worm support 89 about pivot 90 and the disengagement of the gear teeth. The tube 84 and the spout 100 will then rotate freely, thereby precluding the deformation of said spout 100 and the further transmission of distorting forces on the harvester frame 1 or any other component of the harvester.

The tube 84 leans backwards in alignment with the blower housing 48 and is additionally supported at its middle by a band 95, which is affixed to an upper cross frame member 96, extending above the front cross member 56 between the vertical beams 54. A sensor 98, which contacts the circumference of the tube 84, is mounted onto the upper member 96. Two cams 99 on both sides of the tube 84 actuate the sensor 98, when the worm 87 rotates the duct means 52 to their leftmost or rightmost position.

As shown in FIG. 2, the blower housing 48 and the discharge tube 84 are positioned at an angle of about 20 degrees to a vertical line. A pair of supports 102 is welded to the upper portion of the discharge tube 84. They carry a pair of pivot blocks 103, in which two pins 104 are mounted for pivotment of the spout 100 relative to the tube 84. The vertical position of the spout 100 is controlled by a hydraulic cylinder 108, whereof the lower end is assembled to the ring of a ball joint 107 and the upper end to the ring of a ball joint 109. The lower ball joint 107 defines a lower pivot point of the cylinder 108 and is held in vertical alignment with the axis of the pivot pins 104 by a support 106, which is welded to the base plate 78.

The distance between the axis of the tube 84 and the lower pivot point is substantially equal to the diameter of tube 84 and the tube length between the axis of the pivot pins 104 and the base plate 78 is substantially equal to three times the same diameter.

The upper ball joint 109 defines an upper pivot point of the cylinder 108 and is attached to a support member 110, welded to the rear of the spout 100. When the spout 100 is in its nominal position, as shown in FIG. 2, the upper ball joint 109 lies substantially in the same horizontal plane as the pivot pins 104. The angle between the axis of the cylinder 108, passing through the upper ball joint 109 and the lower ball joint 107, and a vertical line is larger than the angle between the center line of the tube 84 and the same vertical line.

Figure 5:
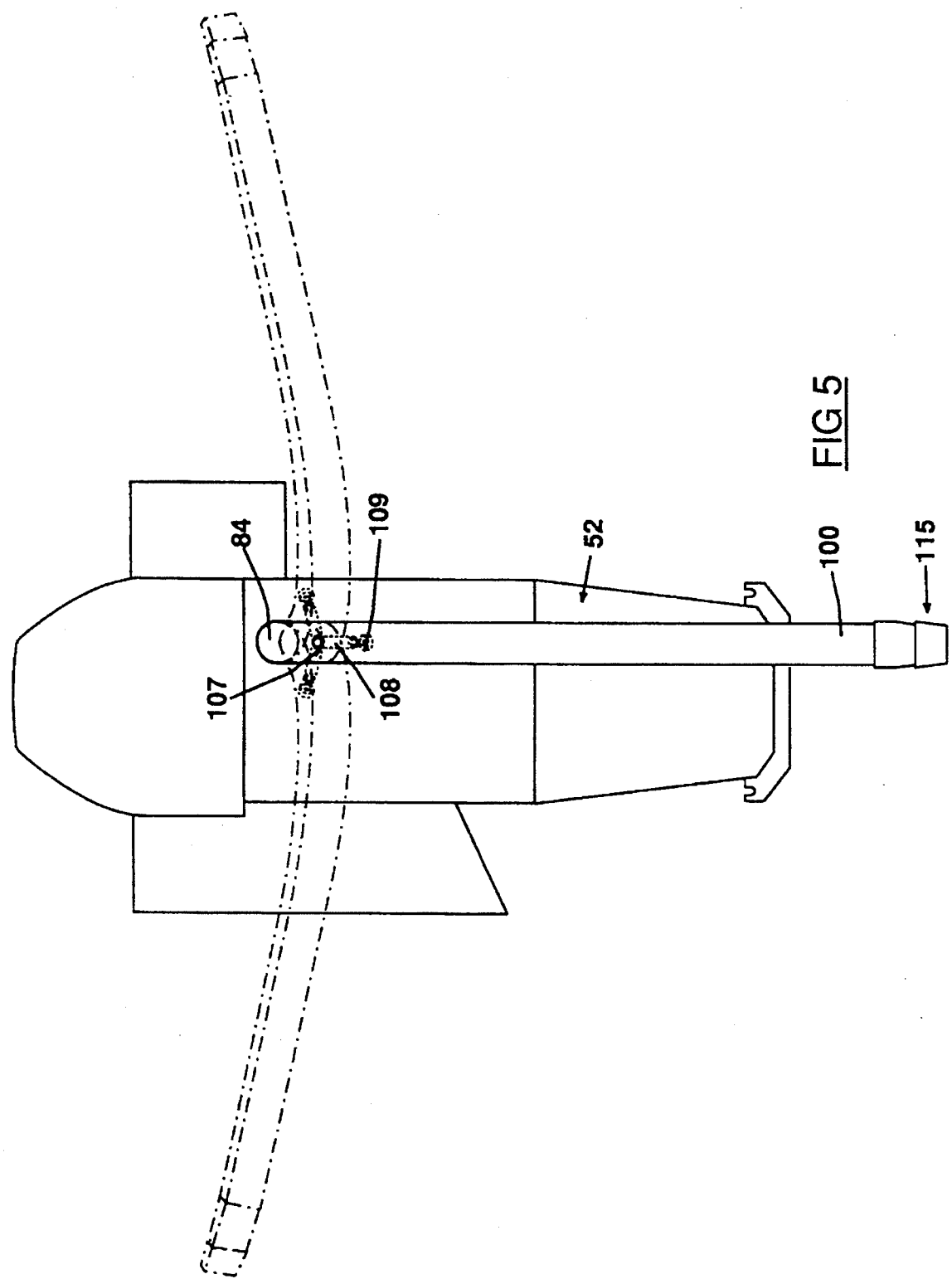
FIG. 5 is a top view of the forage harvester, shown in FIG. 1, illustrating the middle and, in phantom, the leftmost and rightmost positions of the duct means.

As depicted in FIG. 5, this arrangement of the discharge tube 84, the spout 100 and the cylinder 108 permits the rotation of the duct means 52 from its rearward position over 105° to the left and to the right, without interference of the cylinder 108 with the tube 84. Moreover, the large ratio of the tube length to its diameter has an equalizing effect on the crop material flow coming from the blower rotor 49. At the outlet of the tube 84, the flow is more laminar and more evenly spread than in the blower outlet 73. This is particularly advantageous in the transition area between the tube 84 and the spout 100, where build-up of crop material and leakage of crop juice and any injected conserving fluids, such as propionic acid, have to be avoided.

The weight of the spout 100 is supported by the cylinder 108 and the pivot pins 104, which lead the resulting forces to the base plate 78 and the band 95 and therefrom to the main frame 1. No portion of the load is applied upon the blower housing 48 or any other component.

The arrangement of the cylinder 108 between the lower portion of the spout 100 and the base plate 78 enables the use of a cylinder with short stroke, which still permits a large vertical movement of the rear end of the spout.

The placement of the lower ball joint 107 in vertical alignment with the axis of the pivot pins 104 provides a vertical axis of rotation inbetween. Together with said ball joint 107 and said pivot pins 104 the upper ball joint 109 defines a triangle, which is rotated about said vertical axis by the rotation of the tube 84, during which the pins 104 allow for a continuous relative movement between the spout 100 and the tube 84. As the upper ball joint 109, being part of the fixed triangle, is travelled within a horizontal plane, the rear end of the spout 100 is substantially maintained within a horizontal plane. Without the benefit of the vertical alignment of the pins 104 and the lower ball joint 107, the end of the spout 100 would be rotated in an arc out of the horizontal plane.

Figure 6:
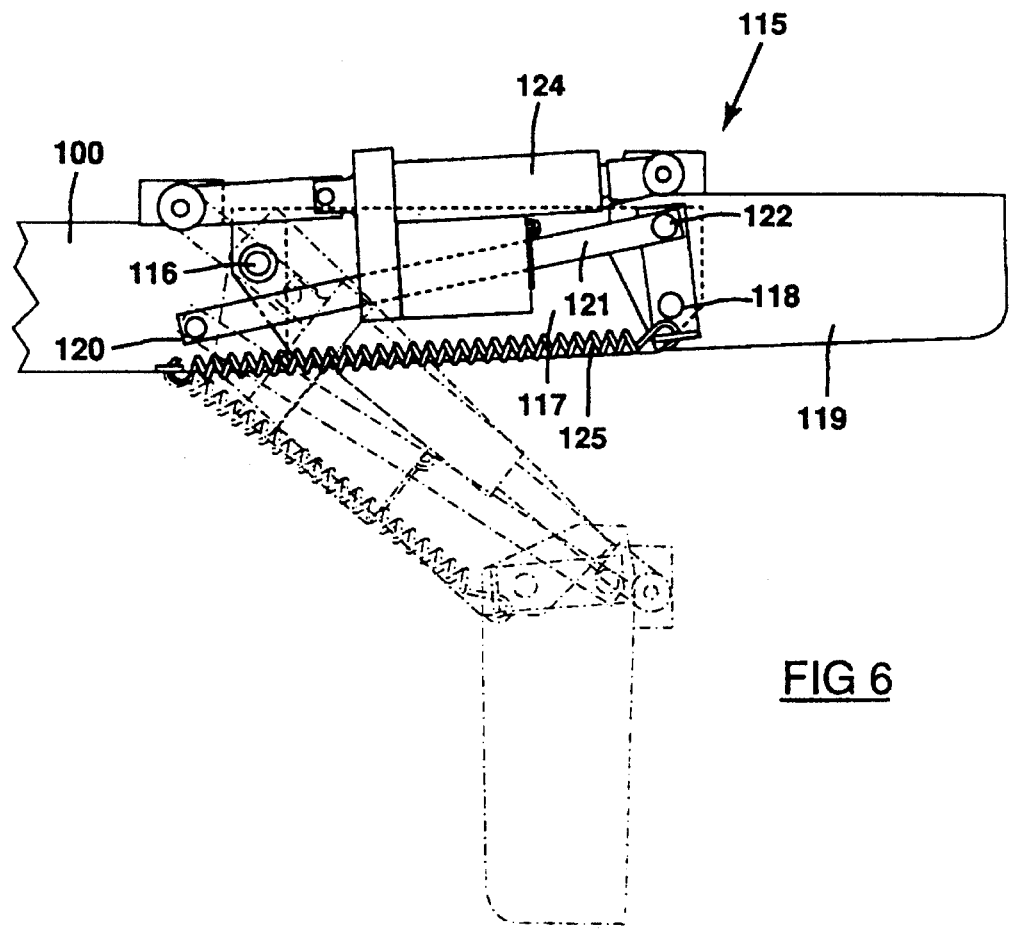
FIG. 6 is a side view of the rear portion of the duct means of FIG. 1, showing in full lines a pivotable deflector in its top position and, in phantom, in its lowest position.

FIG. 6 shows in further detail the deflector 115, which comprises a first deflector member 117, attached by a pair of pivot pins 116 to the rear of the spout 100, and a second deflector member 119, attached by a pair of pivot pins 118 to the first member 117. The sides of the spout 100 and of the deflector members 117, 119 are slightly converging, in order to obtain a more concentrated flow of crop material towards the collecting vehicle. The deflector 115 further comprises a pair of slats 121, which extend between a pair of pivot pins 120 at the rear of the spout 100 and another pair of pivot pins 122 above the pins 118. The second member 119 is pivoted relative to the spout 100 by means of an actuator 124, which comprises an electrical motor and a spindle and which links the rear top of the spout 100 to the top of the second member 119. The actuator 124 is placed aside the deflector 115 in order to minimize the total height of the harvester and to reduce the chances of damage by overhanging trees. The pins 116 and 118 define the position of the first deflector member 117 between the spout 100 and the second deflector member 119. The play of the members 117, 119 on the pins 116, 118 allows substantial relative movement of the second member 119 relative to the spout 100. Therefore a spring 125 is mounted between the lower side of the second deflector member 119 and the spout 100. This spring 125 also counters the reaction forces of the crop material flow on the deflector 115 and reduces the corresponding load on the actuator 124.

When the actuator 124 is extended, as shown in phantom in FIG. 6, the deflector members 117, 119 are pivoted downwardly, in order to deflect the flow of the crop material into a collecting vehicle, which is travelled alongside or behind the harvester.

Figure 7:
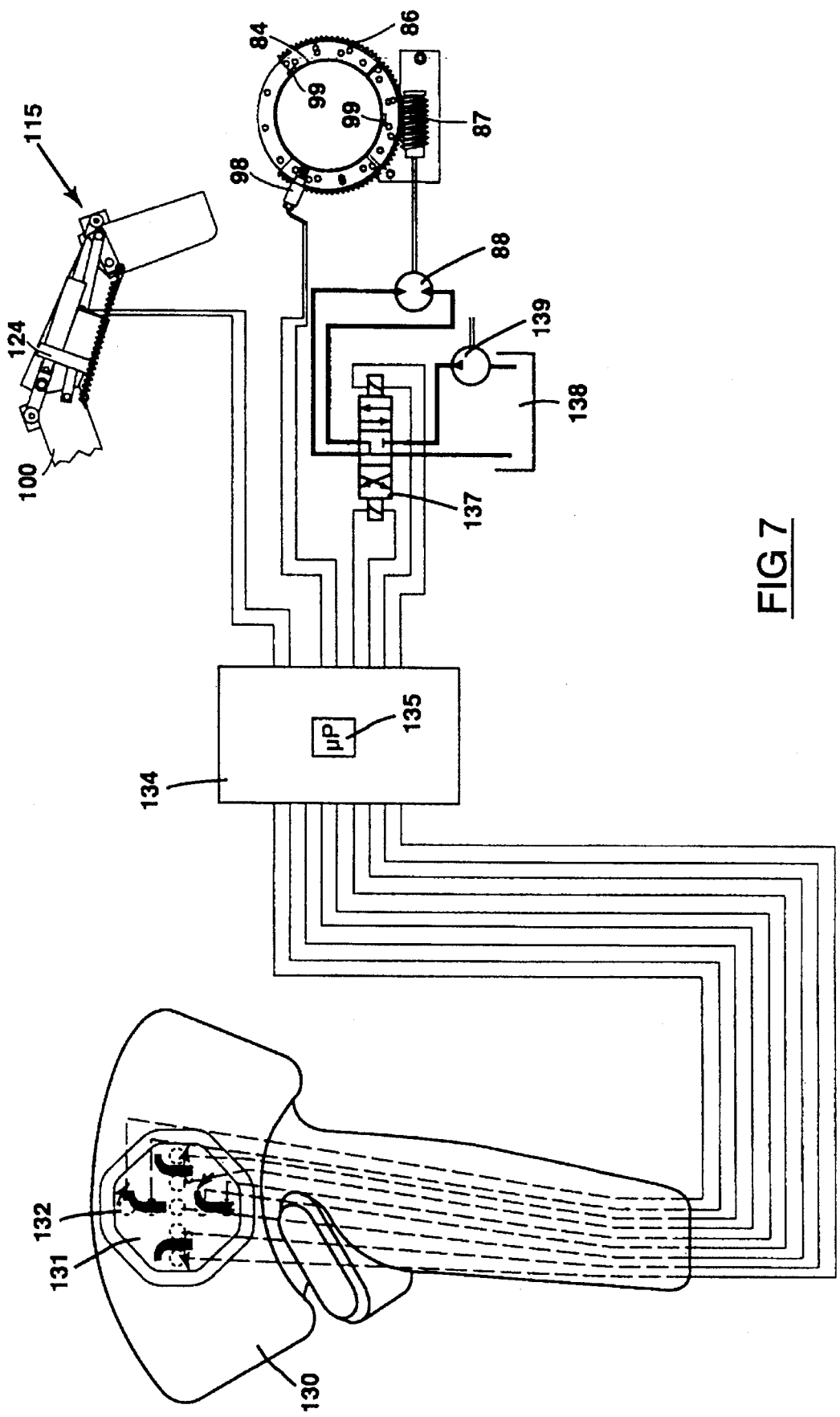
FIG. 7 is a schematic representation of a control system for the rotation of the duct means and the pivotment of the deflector.

As illustrated in FIG. 7, the rotation of the spout 100 and the pivotment of the deflector 115 are commanded by means of a multifunctional push button 131, which is mounted onto an operator's handle 130. The handle 130 comprises eight contact points 132, which are arranged in a cross underneath the button 131. A light pressure on one side of the button 131 only energizes a central contact point 132 for the command of a low speed movement of the spout 100 or the deflector 115. A higher pressure on the side of the button 131 will additionally energize an outer contact point for the command of a high speed movement of the spout 100 or the deflector 115. A push to the left or the right will rotate the tube 84 and the spout 100 horizontally and an upward or downward push will pivot the deflector 115 vertically. It is also possible to engender a simultaneous vertical and horizontal movement by applying a pressure on one of the quadrants defined inbetween the contact points 132. This feature enables a quick guidance of the material flow into the collecting vehicle.

The contact points 132 are connected to and scanned by an electrical control unit 134, which includes a programmable microprocessor 135. The hydraulic motor 88 of the worm 87 is hydraulically connected to a conventional directional control valve 137 with four ports and three distinct positions. Pressurized oil from the tank 138 is fed to the entrance port of the valve 137 by a hydraulic pump 139, which is rotated by the harvester engine (not shown). The condition of the valve 137, and hence of the oil flow, is controlled by two electrical coils, which are connected to the electrical control unit 134. A continuous variation of the oil flow can be obtained by choosing a valve of the proportional type, with a fixed ratio between the oil flow and the current through the valve coils, and applying a variable tension or a pulse-width-modulated signal to the valve coils.

The sensor 98, which detects the leftmost or rightmost positions of the duct means 52, is equally connected to and scanned by the electrical control unit 134. The current to the electrical motor of the deflector actuator 124 is also controlled by the unit 134.

The microprocessor 135 steers the electrical output signals to the valve 137 and the actuator 124 in response to the commands given by means of the push button 131 and to the signals from the sensor 98.

Figure 8:
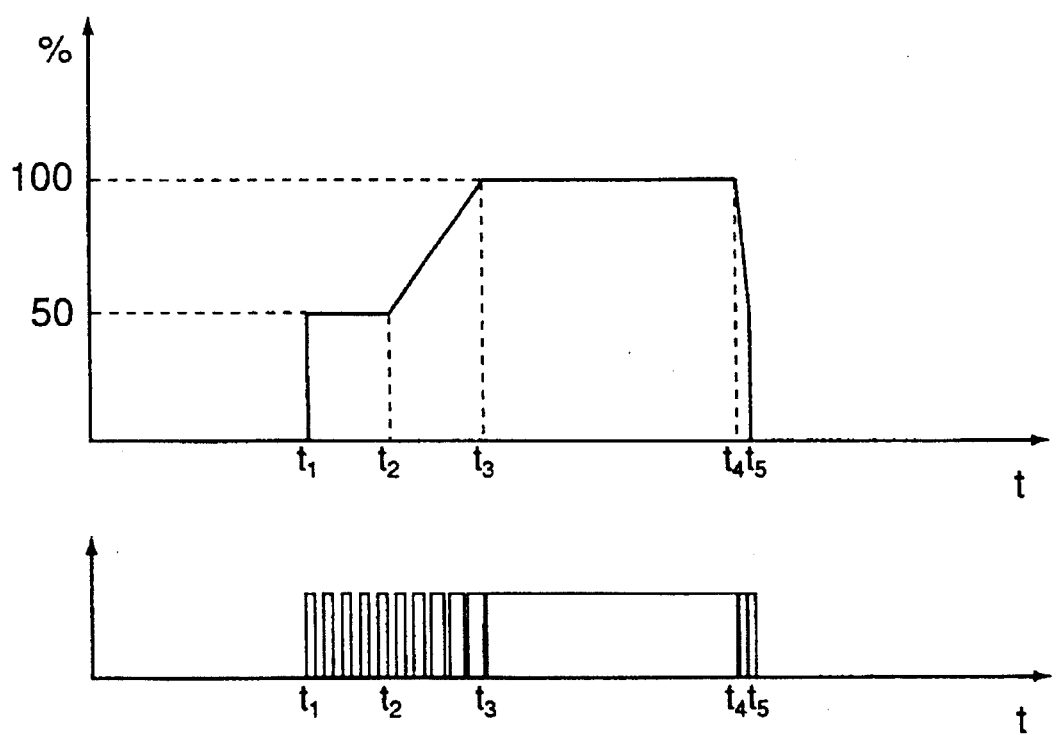
FIG. 8 is a graph of the response of the control system of FIG. 7 to a change in the duct rotation command.

The graph in FIG. 8 shows the output signal to the valve 137 in relation to variations in the input signals. At a first instant $t_1$ a low speed rotation command is given by a light pressure on a side of the push button 131, which energizes an inner contact point 123. Over a coil of the valve 137 a tension is provided, which corresponds to 50% of the tension for a full opening of the valve 137. The hydraulic motor 88 and the spout 100 are rotated at half of their maximum speed.

When the pressure on the side of the push button 131 is increased at an instant $t_2$, the underlying outer contact point 132 will be energized and the microprocessor 135 gradually increases the output tension, until the full opening tension is reached at an instant $t_3$, one second after the instant $t_2$. The spout 100 is now rotated at its maximum speed.

When the rotating command is terminated at an instant $t_4$ by a sudden release of the button 130, the output signal is gradually diminished until it attains the 50% value at an instant $t_5$, a few tenths of a second after $t_4$. The tension then falls back to zero and the spout rotation is stopped.

The same response is generated when at the instant $t_4$ the rotating command is suspended by the microprocessor program, because the duct means 52 have reached their leftmost or rightmost position, where one of the cams 99 has actuated the sensor 98. All further commands for spout rotation in the same sense will be ignored, until the duct means 52 have been rotated in the opposite sense and the sensor 98 has been released by the cam 99.

Consequently, there is no immediate transition of the spout rotation speed from zero to maximum or vice versa. The corresponding high inertia forces of the spout 100 on the worm 87, and therefrom on the frame 1 of the harvester, are hereby avoided. These forces are dampened and there only remain the less important forces which occur during the transition from a standstill to a slow rotation and vice versa. The risk of deformation of harvester components by excessive inertia forces is diminished concurrently.

When the rotation command is suspended during a low speed rotation of the duct means 52, the program of the microprocessor 135 immediately stops the motor 88 and hence the duct means 52. This permits a precise adjustment of the material flow into the collecting vehicle.

The operator may pivot the deflector 115 at a high speed to direct the material flow into the collecting vehicle and at a low speed for choosing a particular deposit area inside the vehicle.

Alternatively, the positioning commands of the spout 100 and the deflector 115 may also be given by a single control handle of the joy-stick type, instead of the multi-functional push button 131.

Other embodiments of the discharge means of a forage harvester can be thought of without departing from the original idea of the invention. For example, the blower rotor may be constituted by a conventional ventilator with radially extending, rectangular paddle plates within a cylindric blower housing, which is positioned above the cutterhead 36. In this case too, the adjustment of the rotor paddles to the housing is decisive for the blower efficiency and deformation of the blower housing has to be avoided.

A prior art harvester, in which the duct means 52 are still directly linked to the blower housing 48, will also benefit from the dampening effect of the rotation control system on the inertia forces of the spout 100. This effect becomes particularly advantageous when the opportunity is offered to rotate the duct means 52 at high speeds as described above.

It will thus be appreciated that there is provided a blower rotor 49 and a housing 48, which is highly protected against deformation during and after assembly to the main frame 1 and whereof the front is easily accessible for adjustment and replacement of the wear plates 42. Furthermore, a precise positioning of the rotor 49 relative to the housing 48 is facilitated by the pull rods 68 and the studs 70 of the blower gearbox 51.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, What is claimed is:

1. A forage harvester, comprising a main frame (1);

a cutterhead assembly (34), comprising a cutterhead (36), operable to comminute crop material;

means for mounting said cutterhead assembly on said main frame;

blower means (48, 49) including a blower outlet (73), means for mounting said blower means on said main frame adjacent said cutterhead assembly;

said blower means disposed to receive the comminuted crop material from said cutterhead assembly (34), and operable to propel said comminuted crop material to said blower outlet (73);

duct means (52), disposed in operative communication with said blower outlet (73) for discharging said comminuted crop material from the forage harvester; the improvement comprising:

mounting means for supportably mounting said duct means (52) to said main frame (1), said mounting means independently mounting said duct means in a manner such that there is no direct, physical connection between said duct means (52) and said blower means (48,49), and said means for mounting said blower means (48, 49) includes means for detaching said blower means from the forage harvester while said duct means (52) remain connected to said main frame (1).

2. A forage harvester, according to claim 1, wherein said cutterhead assembly (34) and said blower means (48, 49) are juxtaposed with no direct binding inbetween, so as to enable removal of said cutterhead assembly (34) from the forage harvester, without prior detaching of said assembly (34) from said blower means (48, 49).

3. A forage harvester, according to claim 2, wherein said duct means (52) comprise a lower member (84) in register with said blower outlet (73), and an upper member (100), mounted onto said lower member (84) and operable to guide the flow of the crop material along a curved path.

4. A forage harvester, according to claim 3, wherein said blower outlet (73) is installed within a cylindrical portion of said lower member (84) of said duct means (52) and in that the space between the outside of said blower outlet (73) and said cylindrical portion is closed with a flat rubber seal (79).

5. A forage harvester, according to claim 3, wherein said lower duct member (84) is mounted onto a base plate (78) which is affixed to said main frame (1);

said upper duct member (100) is connected at its lower end to said lower duct member (84) by pivot means (103, 104), permitting a vertical movement of said upper duct member (100); and said upper member (100) is positioned relative to said main frame (1) by support means (107, 108, 109, 110), comprising an upper pivot (109), linked to said upper duct member (100), and a lower pivot (107), linked to said base plate (78).

6. A forage harvester, according to claim 5, wherein said duct means (52) further comprise means (86, 87) for the rotation of the duct members (84, 100) relative to the base plate (78);

said blower outlet (73) and said lower duct member (84) have a substantially linear center line which is disposed at an acute angle to a vertical line projecting through said base plate (78);

said upper pivot (109) of said support means (107, 108, 109, 110) is linked to the underside of said upper duct member (100); and said lower pivot (107) is in substantially vertical alignment with said pivot means (103, 104), connecting said upper duct member (100) to said lower duct member (84), whereby, upon rotation of said duct members by said rotation means (86, 87), said upper member (100) is rotated in a substantially horizontal plane.

7. A forage harvester, according to claim 6, wherein said support means (107, 108, 109, 110) comprise a member (108), which is linked to said upper pivot (109) and said lower pivot (107) and which can be shortened or lengthened in order to vertically position said upper duct member (100) relative to said base plate (78).

8. A forage harvester, according to claim 5, wherein said lower duct member (84) comprises a cylindrical portion, disposed between said base plate (78) and said pivot means (103, 104) and having a length, which is greater than twice the inner diameter thereof.

9. A forage harvester, according to claim 8, wherein said upper pivot (109) of the support means (107, 108, 109, 110) is connected to said lower portion of said upper duct member (100) at a point which lies substantially in the horizontal plane passing through the axis of the pivot means (103, 104).

10. A forage harvester, according to claim 8, wherein the distance between the center line of the cylindrical portion and said lower pivot (107) is equal to or greater than the outer diameter of the cylindrical portion; and the angle between the vertical line projecting through said lower pivot (107) and the line passing through the lower pivot (107) and said upper pivot (109) is greater than the acute angle between the center line of the cylindrical portion and the vertical line projecting through said base plate (78), so as to permit a free rotation of said duct means (52) over more than 100° in both directions, starting from the rearmost position, without interference between said lower duct member (84) and said support means (107, 108, 109, 110).

11. A forage harvester, according to claim 3, wherein said duct means (52) are provided with rotation means (86, 87), operable to rotate said upper duct member (100) and said lower duct member (84) with respect to said main frame (1), said rotation means (86, 87) comprising a shear bolt assembly (89, 90, 91), having at least one shear bolt (91); the arrangement being such that, upon creation of an excessive external load on said upper duct member (100), said shear bolt (89, 90, 91) assembly is ruptured in order to permit free rotation of said duct members (84, 100).

12. A forage harvester, according to claim 11, wherein said rotation means (86, 87) comprise a section of a worm gear (86), which is attached coaxially to the rotational axis of said duct members (84, 100), and a worm (87) operably meshing therewith, which worm (87) is rotatably mounted in a support (89), which is secured relative to said main frame (1) by a pivot (90) and a shear bolt (91); and said pivot (90) is positioned to permit disengagement of said worm (87) from said worm gear (86) after rupture of said shear bolt (91).

13. A forage harvester, according to claim 1, wherein said duct means (52) are provided with:

means (86, 87) operable to rotate said upper duct member (100) and the lower duct member (84) with respect to said main frame (1); and a rotation control system (130, 134, 137, 88), which is operable to rotate said duct members (84, 100) at a variable rotational speed.

14. A forage harvester, according to claim 13, wherein said rotation control system (130, 134, 137, 88) comprises a single handle or push button (131) for the command of a low rotational speed and a high rotational speed, and the high speed command effects a continuous increase of the rotation speed, until the high speed is reached.

15. A forage harvester, according to claim 14, wherein the release of the high speed command effects a continuous decrease of the rotation speed, until the low speed is reached.

16. A forage harvester, according to claim 13, wherein said rotation control system (130, 134, 137, 88) comprises a hydraulic actuator (88), operable to rotate said duct members (84, 100), an electrically controlled valve (137), operable to provide a variable fluid flow to said actuator (88), and an electric control device (134), operable to receive rotation commands and to generate a control signal to said valve (137).

17. A forage harvester, according to claim 16, wherein said electric control device (134) comprises a microprocessor (135), which is programmed to check the rotation command given by the operator and, when an occurrence or a cessation of a rotation command is detected, to generate a continuously increasing, respectively decreasing signal to said valve, until the maximum, respectively minimum signal, corresponding to the commanded speed, is reached.

18. A forage harvester, according to claim 1, wherein said discharge duct means (52) further comprise an adjustable deflector (115), which is pivotably attached to the rear portion of said upper duct member (100) and whereof the vertical movement is remotely controlled by a deflector adjustment system (130, 134, 124), which is operable to pivot said deflector (115) at a low and a high speed.

19. A forage harvester, according to claim 18, wherein both the low and high speed pivotment of the deflector (115) are commanded by the operator through a single push button (131).

20. A forage harvester, according to claim 18, wherein said deflector adjustment system (130, 134, 124) comprises an electrical motor (124), operable to pivot said deflector (115), and an electrical control device (134), operable to receive pivotment commands and to energize said motor (124).

* * * * *